United States Patent
Li et al.

(10) Patent No.: US 11,753,550 B2
(45) Date of Patent: Sep. 12, 2023

(54) BORATE AND SILICATE COATING FOR IMPROVED ACOUSTICAL PANEL PERFORMANCE AND METHODS OF MAKING SAME

(71) Applicant: USG INTERIORS, LLC, Chicago, IL (US)

(72) Inventors: Qinghua Li, Rolling Meadows, IL (US); Naser Aldabaibeh, Homer Glen, IL (US)

(73) Assignee: USG INTERIORS, LLC, Chicago, IL (US)

(*) Notice: Subject to any disclaimer, the term of this patent is extended or adjusted under 35 U.S.C. 154(b) by 1025 days.

(21) Appl. No.: 16/009,053

(22) Filed: Jun. 14, 2018

(65) Prior Publication Data

US 2019/0382589 A1    Dec. 19, 2019

(51) Int. Cl.
*C09D 1/02* (2006.01)
*C09D 7/61* (2018.01)
*E04B 1/86* (2006.01)
*E04B 9/04* (2006.01)
*C08K 3/013* (2018.01)

(52) U.S. Cl.
CPC ............... *C09D 1/02* (2013.01); *C09D 7/61* (2018.01); *E04B 1/86* (2013.01); *E04B 9/045* (2013.01); *C08K 3/013* (2018.01)

(58) Field of Classification Search
CPC .... C09D 1/02; C09D 7/61; E04B 1/86; E04B 9/045; E04B 9/001; C08K 3/013; C04B 2111/0062; C04B 28/26
See application file for complete search history.

(56) References Cited

U.S. PATENT DOCUMENTS

| 1,769,519 | A | 7/1930 | King et al. |
| 2,020,403 | A | 11/1935 | Engle |
| 3,246,063 | A | 4/1966 | Podgurski |
| 3,307,651 | A | 3/1967 | Podgurski |

(Continued)

FOREIGN PATENT DOCUMENTS

| CN | 1942532 A | 4/2007 |
| CN | 102036814 A | 4/2011 |

(Continued)

OTHER PUBLICATIONS

"Bonding and Coating Applications of PQ® Soluble Silicates" brochure, Industrial Chemicals Division, PQ Corporation, 7 pp. (2006).

(Continued)

*Primary Examiner* — Humera N. Sheikh
*Assistant Examiner* — Kevin C T Li
(74) *Attorney, Agent, or Firm* — MARSHALL, GERSTEIN & BORUN LLP

(57) ABSTRACT

The disclosure provides a coating composition for improving the sag resistance of a fibrous panel, the composition including 10 to 100 wt. % inorganic binder, based on the total weight of the dry coating, wherein the inorganic binder includes a borate salt and at least one of an alkali metal silicate or an alkaline earth metal silicate, and the inorganic binder is water soluble. Further provided are fibrous panels having a backing side and an opposing facing side including the coating of the disclosure, and methods of preparing same.

20 Claims, 1 Drawing Sheet

(56) References Cited

U.S. PATENT DOCUMENTS

| | | | |
|---|---|---|---|
| 3,426,063 A | 2/1969 | Gros | |
| 3,445,257 A | 5/1969 | Hloch | |
| 3,802,386 A | 4/1974 | Wendlandt et al. | |
| 3,930,876 A | 1/1976 | Nakajima et al. | |
| 4,169,735 A * | 10/1979 | Boberski | C09D 1/02 |
| | | | 106/38.3 |
| 4,288,252 A | 9/1981 | Neely | |
| 4,328,019 A | 5/1982 | Dejaiffe et al. | |
| 4,541,854 A | 9/1985 | Schonhaar et al. | |
| 4,720,295 A | 1/1988 | Bronshtein | |
| 4,818,595 A | 4/1989 | Ellis | |
| 4,911,788 A | 3/1990 | Pittman et al. | |
| RE33,773 E | 12/1991 | Guerro et al. | |
| 5,250,153 A | 10/1993 | Izard et al. | |
| 5,332,699 A | 7/1994 | Olds et al. | |
| 5,472,917 A | 12/1995 | Talling et al. | |
| 5,496,392 A | 3/1996 | Sims et al. | |
| 5,558,710 A | 9/1996 | Baig | |
| 5,614,449 A | 3/1997 | Jensen | |
| 5,709,728 A | 1/1998 | Fleckenstein et al. | |
| 5,750,255 A | 5/1998 | Yoshida et al. | |
| 5,776,392 A | 7/1998 | Schmuck | |
| 5,911,818 A | 6/1999 | Baig | |
| 6,077,798 A | 6/2000 | Rapp | |
| 6,171,388 B1 | 1/2001 | Jobbins | |
| 6,265,335 B1 | 7/2001 | Oleske et al. | |
| 6,305,495 B1 | 10/2001 | Keegan | |
| 6,428,616 B1 | 8/2002 | Neely, Jr. | |
| 6,443,258 B1 | 9/2002 | Putt et al. | |
| 6,893,752 B2 | 5/2005 | Veeramasuneni et al. | |
| 6,897,173 B2 | 5/2005 | Bernard et al. | |
| 6,919,132 B2 | 7/2005 | Felegi, Jr. et al. | |
| 7,056,460 B2 | 6/2006 | Englert | |
| 7,364,015 B2 | 4/2008 | Englert et al. | |
| 7,851,052 B2 | 12/2010 | Caldwell | |
| 8,133,357 B2 | 3/2012 | Cao et al. | |
| 8,173,221 B2 | 5/2012 | Jennings et al. | |
| 8,536,259 B2 | 9/2013 | Carbo et al. | |
| 8,603,231 B2 | 12/2013 | Wagh et al. | |
| 8,697,588 B2 | 4/2014 | Brown | |
| 8,967,823 B2 | 3/2015 | D'Antonio | |
| 9,073,780 B2 | 7/2015 | Schinkinger et al. | |
| 9,076,428 B2 | 7/2015 | Kipp et al. | |
| 9,382,153 B2 | 7/2016 | Fisher et al. | |
| 2004/0039098 A1 | 2/2004 | Belmares et al. | |
| 2005/0255318 A1 | 11/2005 | Czerny | |
| 2007/0055012 A1 | 3/2007 | Caldwell | |
| 2007/0167551 A1 | 7/2007 | Goodwin et al. | |
| 2007/0277948 A1 | 12/2007 | Carbo et al. | |
| 2009/0155603 A1 | 6/2009 | Zheng et al. | |
| 2010/0152030 A1 * | 6/2010 | Bai | C09D 1/02 |
| | | | 502/182 |
| 2011/0126957 A1 * | 6/2011 | Wierzbicki | C09K 21/02 |
| | | | 156/60 |
| 2011/0151129 A1 * | 6/2011 | Castillo | D21H 21/34 |
| | | | 427/397.8 |
| 2011/0262721 A1 | 10/2011 | Albertelli et al. | |
| 2013/0334726 A1 | 12/2013 | Hernandez-Torres et al. | |
| 2016/0032583 A1 | 2/2016 | Xu et al. | |
| 2018/0079691 A1 * | 3/2018 | Donelan | C04B 35/6316 |

FOREIGN PATENT DOCUMENTS

| | | |
|---|---|---|
| CN | 103145342 A | 6/2013 |
| DE | 2455691 B1 | 5/1976 |
| DE | 4110454 A1 | 10/1992 |
| DE | 4213388 A1 | 8/1993 |
| DE | 19725761 A1 | 12/1998 |
| DE | 10239631 A1 | 3/2004 |
| EP | 0194371 A1 | 9/1986 |
| EP | 1160387 A2 | 12/2001 |
| EP | 1321595 A2 | 6/2003 |
| EP | 2481859 A1 | 8/2012 |
| EP | 2599839 A1 | 6/2013 |
| GB | 1519639 A | 8/1978 |
| RU | 2118975 C1 | 9/1998 |
| WO | WO-02/068359 A1 | 9/2002 |
| WO | WO-2008/079756 A1 | 7/2008 |
| WO | WO-2010/114626 A1 | 10/2010 |
| WO | WO-2013/080025 A1 | 6/2013 |

OTHER PUBLICATIONS

"Sodium and Potassium Silicates: Versatile Compounds for Your Applications" brochure, PQ Europe, 16 pp. (Oct. 2004).

"Soluble Silicates in Geotechnical Grouting Applications", Bulletin 52-53, Industrial Chemicals Division, PQ Corporation, 6 pp. (2003).

McDonald et al., Recent Developments in Soluble Silicate Based Binders and Coatings, 10 pp. (applicant admitted prior art).

McDonald et al., Sodium Silicate a Binder for the 21st Century, Industrial Chemicals Division, The PQ Corporation, 6 pp. (applicant admitted prior art).

Rabbii, Sodium silicate glass as an inorganic binder in foundry industry, Iranian Polymer J., 10(4):229-35 (2001).

International Application No. PCT/US2019/036757, International Search Report and Written Opinion, dated Sep. 27, 2019.

Chinese Patent Application No. 2019800323403, First Office Action, dated Dec. 2, 2021.

* cited by examiner

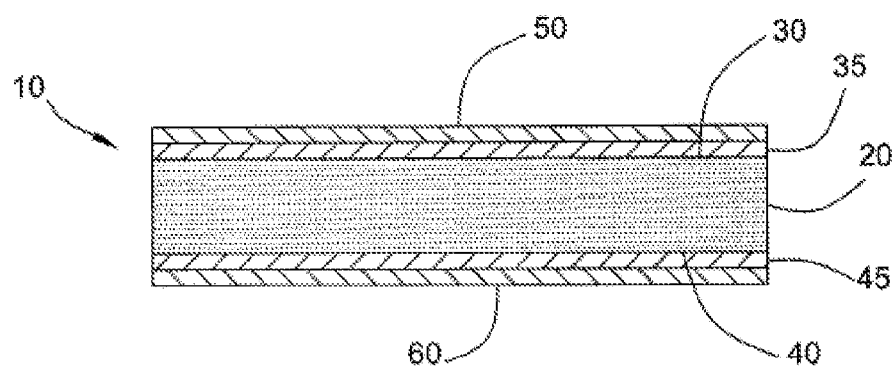

BORATE AND SILICATE COATING FOR IMPROVED ACOUSTICAL PANEL PERFORMANCE AND METHODS OF MAKING SAME

FIELD OF THE INVENTION

The disclosure relates generally to a curable coating composition for acoustical panels, acoustical panels coated with the curable coating composition of the disclosure, and methods of making same. More particularly, the disclosure relates to a curable coating including an inorganic borate and silicate binder, wherein the binder is water soluble.

BACKGROUND

Acoustical panels (or tiles) are specially designed systems that are intended to improve acoustics by absorbing sound and/or reducing sound transmission in an indoor space, such as a room, hallway, conference hall, or the like. Although there are numerous types of acoustical panels, a common variety of acoustical panel is generally composed of mineral wool fibers, fillers, colorants and a binder, as disclosed, for example, in U.S. Pat. No. 1,769,519. These materials, in addition to a variety of others, can be employed to provide acoustical panels with desirable acoustical properties and other properties, such as color and appearance.

In order to prepare panels, fibers, fillers, bulking agents, binders, water, surfactants and other additives are typically combined to form a slurry and processed. Cellulosic fibers are typically in the form of recycled newsprint. The bulking agent is typically expanded perlite. Fillers may include clay, calcium carbonate or calcium sulfate. Binders may include starch, latex and reconstituted paper products linked together to create a binding system that facilitates locking all ingredients into a desired structural matrix.

Organic binders, such as starch, are often the primary binder component providing structural adhesion for the panel. Starch is a preferred organic binder because, among other reasons, it is relatively inexpensive. For example, panels containing newsprint, mineral wool and perlite can be bound together economically with the aid of starch. Starch imparts both strength and durability to the panel structure, but is susceptible to problems caused by moisture. Moisture can cause the panel to soften and sag, which is unsightly in a ceiling and can lead to the weakening of the panel.

One method used to counter problems caused by moisture in panels is to coat the back of the panels with a melamine-formaldehyde resin based coating with or without a urea-formaldehyde component. When such a formaldehyde resin based coating is exposed to moisture or humidity, it tends to resist the compressive forces on the back surface that result from the downward sagging movement.

Cured melamine-formaldehyde resins have a rigid and brittle cross-linked structure when properly cured. This rigid structure acts to resist the compressive forces on the back surface that result from the downward sagging movement. However, formaldehyde resins tend to emit formaldehyde, which is a known environmental irritant.

To decrease formaldehyde emissions, formaldehyde reactive materials, such as urea, have been added to scavenge the free formaldehyde. Unfortunately, such small molecule scavengers can end cap the reactive groups of the formaldehyde resin, and thereby prevent significant levels of cross-linking from occurring. As a result, the desired highly cross-linked polymer structure is never formed. The resulting coating is weak and will not act to resist sag.

Although there are a variety of commercially available acoustical panel products classified as low volatile organic chemical (VOC) emitters, these products nonetheless emit detectable levels of formaldehyde due to the presence of various formaldehyde emitting components that are employed in these panels. Although formaldehyde emissions that are generated during heat exposure in the manufacturing process may be exhausted into stacks or thermal oxidizers, the resulting product will still contain residual formaldehyde, which can be emitted post-installation. A reduction in formaldehyde emissions, or elimination of such emissions, will provide improved indoor air quality in those locations where acoustical panels are installed, such as public buildings including schools, healthcare facilities, or office buildings.

SUMMARY

One aspect of the disclosure provides a coated fibrous panel comprising a fibrous panel comprising a backing side and an opposing facing side having a cured coating layer disposed on at least one side of the panel, the cured coating layer comprising about 10 to 100 wt. % inorganic binder, based on the total weight of the dry coating, wherein the inorganic binder comprises a borate salt and a metal silicate selected from the group consisting of alkali metal silicates, alkaline earth metal silicates, and combinations thereof, and the inorganic binder is water soluble.

Another aspect of the disclosure provides a method of coating a fibrous panel comprising providing a fibrous panel comprising a backing side and an opposing facing side, and depositing a first coating layer on at least one side of the fibrous panel, the first coating layer comprising an inorganic binder, wherein the inorganic binder is present in an amount between about 10 and 100 wt. %, based on the total weight of the dry first coating layer, the inorganic binder comprises a borate salt and a metal silicate selected from the group consisting of an alkali metal silicate, an alkaline earth metal silicate, and combinations thereof, and the inorganic binder is water soluble.

Another aspect of the disclosure provides a curable coating composition for improving the sag resistance of a fibrous panel, the curable coating composition comprising about 10 to 100 wt. % inorganic binder, based on the total weight of a dry coating formed therefrom, wherein the inorganic binder comprises a borate salt and a metal silicate selected from the group consisting of an alkali metal silicate, an alkaline earth metal silicate and combinations thereof, and the inorganic binder is water soluble.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the disclosure to the specific embodiments described herein.

BRIEF DESCRIPTION OF THE DRAWINGS

FIG. 1 schematically illustrates a perspective view of a coated panel having a coating according to an embodiment of the disclosure.

DETAILED DESCRIPTION

The disclosure provides a coated fibrous panel including a fibrous panel having a backing side and an opposing facing side and a cured coating layer disposed on at least one side of the panel, the cured coating layer including 10 to 100 wt. % inorganic binder, based on the total weight of the dry coating, wherein the inorganic binder comprises a borate salt and a metal silicate selected from the group consisting of an alkali metal silicate, an alkaline earth metal silicate, and combinations thereof, and the inorganic binder is water soluble.

As used herein, the terms "panel" and "tile" should be considered interchangeable. Similarly, the terms "fibrous panel," "ceiling tile," and "acoustical tile" should be considered interchangeable.

As used herein, the terms "coating composition" and "coating layer" should be considered interchangeable, insomuch as the coating layer is used to refer to the coating composition when applied or deposited on the fibrous panel. As used herein, the term "dry coating," "dry coating layer," or "cured coating layer" can be used interchangeably to refer to the final coating on a coated fibrous panel after any drying and/or curing steps are carried out. That is, any aqueous solvent used to mix the inorganic binders of the disclosure, such as water and the like, that may have been present in the coating composition has been evaporated or dehydrated through heating, chemical curing, or any other process suitable for drying a coated fibrous panel.

Advantageously, the coated fibrous panels of the disclosure demonstrate significantly reduced sag when compared to uncoated fibrous panels, as well as fibrous panels having a coating including only metal silicate binder(s) (i.e. the inorganic binder does not include a borate salt), and at least similar, if not improved, sag resistance relative to finished fibrous panels having the industry-standard formaldehyde coating.

Optionally, the coating layer is substantially free of formaldehyde and substantially free of organic polymeric binder(s). Similarly, in embodiments, the inorganic binder is substantially free of formaldehyde and substantially free of organic polymeric binder(s). Advantageously, when the coating layer(s) of the coated fibrous panels of the disclosure are substantially free of formaldehyde and/or organic polymeric binders, they have a reduced risk of formaldehyde emissions even when compared with known formaldehyde-free coatings. In particular, formaldehyde-free coatings for acoustical panels generally include organic polymeric binders. Certain organic polymeric binders inherently contain, release, emit or generate detectable and quantifiable levels of formaldehyde. Thus, even though formaldehyde may not be a component of an organic polymeric binder as used in a coating for acoustical panels, the panel may still release, emit or generate formaldehyde for a number of reasons, including, for example, degradation of organic polymeric binders. In embodiments wherein the coating compositions of the disclosure are substantially free of organic polymeric binders, the coating compositions and coated fibrous panels do not contain or release formaldehyde associated with the breakdown of such organic polymeric binders.

Alternatively, in embodiments, the coating layer includes additional binders, including, but not limited to, organic polymeric binders.

As used herein, "substantially free of formaldehyde" means that the coating layer and/or binder is not made with formaldehyde or formaldehyde-generating chemicals and will not release formaldehyde under normal service conditions. The term "substantially free of formaldehyde" can be further defined as meaning free of intentionally or purposely added formaldehyde, such that an incidental or background quantity of formaldehyde (e.g., less than 100 ppb) may be present in the coating composition. Certain additives such as wet-state preservatives or biocides included in surface treatments and backcoatings can release, emit or generate detectable and quantifiable levels of formaldehyde. Thus, even though formaldehyde may not be a purposely added component used in acoustical panels, the panel may still release, emit or generate formaldehyde for a number of reasons, including, for example, degradation of biocides.

The quantity of formaldehyde present in the coating composition can be determined according to ASTM D5197 by heating dried coating samples to 115° C. in a humidified Markes Microchamber and then collecting the emissions under controlled conditions using a 2,4-dinitrophenylhydrazine (DNPH) cartridge. Following exposure, the DNPH cartridge is washed with acetonitrile, the acetonitrile wash is diluted to a 5 ml volume, and the sample is analyzed by liquid chromatography. Results are reported in µg/mg of coating sample and compared to a control sample. Samples that are within experimental error of the control sample over a significant series of tests are clearly substantially formaldehyde free.

As used herein, "substantially free of an organic polymeric binder" means that the inorganic binder does not contain an organic polymeric binder and that the coating composition including the inorganic binder also does not contain significant amounts of purposely added organic polymeric binder. Thus, incidental or background quantity of organic polymer binder (e.g., less than about 100 ppb) may be present in the coating compositions according to the disclosure (e.g., that leached out of the panel core material) and be within the scope of the disclosure. As used herein "organic polymeric binder" includes organic polymers and oligomers and further includes organic monomers that can polymerize in situ (with or without curing) to form an organic polymer.

The disclosure further provides methods of coating fibrous panels, and curable coating compositions for improving the sag resistance of fibrous panels.

Inorganic Binder

In general, the inorganic binder of the disclosure includes curable borate salt and metal silicate compounds that link together to create a binding system that facilitates the retention of all coating composition ingredients into a desired structural matrix. The inorganic binder comprises borate salt and a metal silicate selected from the group consisting of alkali metal silicates, alkaline earth metal silicates, and combinations thereof. The inorganic binder according to the disclosure is water soluble. Generally, during drying, coatings change from the liquid to solid state due to evaporation of the solvent and/or because of physical and/or chemical reactions of the binder media [Coatings Encyclopedic Dictionary, S. LeSota, Ed., Federation of Soc. for Coatings Technology, Blue Bell, P A., 1995].

The inorganic binder of the disclosure includes a borate salt. Any water soluble borate salt and combinations thereof are considered suitable for the coating composition of the disclosure. Suitable borate salts include, for example, sodium metaborate, sodium tetraborate, potassium tetraborate, potassium pentaborate, ammonium pentaborate, borax decahydrate, boric oxide, lithium borate, and combinations thereof. In embodiments, the borate salt is selected from the group consisting of sodium metaborate, sodium tetraborate, potassium tetraborate, potassium pentaborate, ammonium pentaborate, borax decahydrate, boric oxide, lithium borate, and combinations thereof. The borate salt can be an anhydrous borate salt or a hydrated borate salt. For example, according to the disclosure, an inorganic binder including sodium tetraborate encompasses an inorganic binder including anhydrous sodium tetraborate, sodium tetraborate pentahydrate, or mixtures thereof.

The inorganic binder of the disclosure further includes a metal silicate. Any water soluble metal silicate and combinations thereof may be included in the coating compositions of the disclosure. In embodiments, the metal silicate is selected from the group consisting of alkali metal silicate, alkaline earth metal silicate, and combinations thereof. Specific metal silicates include, but are not limited to, sodium silicate, potassium silicate, lithium silicate, magnesium silicate, calcium silicate, beryllium silicate, and combinations thereof. In embodiments, the metal silicate is an alkaline earth metal silicate. In embodiments, the alkaline earth metal silicate is selected from the group consisting of magnesium silicate, calcium silicate, beryllium silicate, and combinations thereof. In embodiments, the metal silicate is an alkali metal silicate. In embodiments, the alkali metal silicate is selected from sodium silicate, potassium silicate, lithium silicate, and combinations thereof. In embodiments, the alkali metal silicate includes sodium silicate.

Sodium silicate solutions may also be referred to as "waterglass" and have a nominal formula $Na_2O(SiO_2)_x$. Commercially available sodium silicate solutions have a weight ratio of $SiO_2$:$Na_2O$ in the range of about 1.5 to about 3.5. The ratio represents an average of various molecular weight silicate species. Suitable sodium silicate solutions have a weight ratio of $SiO_2$:$Na_2O$ in the range of about 1.5 to about 3.5, about 2 to about 3.2, about 2.5 to about 3.2, for example, about 2.5, about 2.6, about 2.7, about 2.8, about 2.9, about 3.0, about 3.1, or about 3.2. In embodiments, the sodium silicate solution may have a weight ratio of $SiO_2$:$Na_2O$ in the range of about 3.0 to about 3.2.

Coating compositions comprising borate salts in combination with alkali metal and/or alkaline earth metal silicates, wherein the metal silicates are typically provided as aqueous solutions/dispersions, have physical and chemical properties that are useful in coating applications. When applied as a thin coating to a fibrous panel, the borate and silicate solution/dispersion dries to form a coating having one or more of the following advantages: low cost, non-flammable, resistant to temperatures up to 3000° F. (about 1650° C.), resistant to sag, odorless, and non-toxic.

In embodiments, the inorganic binder includes sodium silicate and sodium tetraborate.

Optionally, the coating according to the disclosure is substantially free of additional binders. That is, in embodiments, the coating is substantially free of non-borate salt binders, substantially free of non-alkali metal silicate binder, and substantially free of non-alkaline earth metal silicate binders. As used herein "substantially free of non-borate salts," "substantially free of non-alkali metal silicates," and "substantially free of non-alkaline earth metal silicates" means that the coating does not contain significant amounts of purposely added non-alkali metal silicate binders, non-alkaline earth metal silicate binder, or non-borate salt binders (e.g., less than 3 wt. %, less than 2 wt. %, or less than 1 wt. %, based on the total weight of the dry coating, may be present in the coating and be within the scope of the disclosure). Thus, in embodiments, the inorganic binder according to the disclosure can consist of, or consist essentially of, one or more borate salts, alkali metal silicates, alkaline earth metal salts, and combinations thereof.

The amount of inorganic binder in the coating composition or coating layer according to the disclosure is not particularly limited. The inorganic binder can be present in an amount ranging from about 10 wt. % to about 100 wt. %, about 25 wt. % to about 75 wt. %, about 40 wt. % to about 60 wt. %, or about 30 wt. % to about 50 wt. %, for example, about 10, 15, 20, 22, 25, 27, 30, 32, 35, 37, 40, 42, 45, 47, 50, 55, 60, 65, 70, 75, 80, 85, 90, 95, or 100 wt. %, based on the total weight of the dry coating.

Inorganic Filler

Optionally, the coating layer and/or coating composition of the coated fibrous panel according to the disclosure can include an inorganic filler. Generally, any inorganic solid, inert mineral or mineral-like material can be added as an inorganic filler.

Suitable mineral and mineral-like fillers include, for example, clay (e.g. kaolin clay or bentonite clay), mica, sand, barium sulfate, silica, talc, magnesia, olivine, dolomite, tremolite, xonolite, vermiculite, gypsum, perlite, limestone (calcite or aragonite), magnesite, wollastonite, zinc oxide, zinc sulfate, hollow beads, bentonite salts, fly ash, bottom ash, coal ash, steel slag, iron slag, limestone slag, zeolite, and combinations thereof. In embodiments, the filler is selected from the group consisting of clay, mica, sand, barium sulfate, silica, talc, magnesia, olivine, dolomite, tremolite, xonolite, vermiculite, gypsum, perlite, limestone (calcite or aragonite), magnesite, wollastonite, zinc oxide, zinc sulfate, hollow beads, bentonite salts, fly ash, bottom ash, coal ash, steel slag, iron slag, limestone slag, zeolite, and combinations thereof. In embodiments, the filler comprises calcium carbonate. In embodiments, the filler includes calcium carbonate and kaolin clay.

The particle size of the inorganic filler is not particularly limited, provided that the particle size does not adversely affect the binding properties of the inorganic binder of the coating. In embodiments, the particle size of the inorganic filler can be in a range from about 1 μm to about 200 μm, from about 10 μm to about 100 μm, or from about 25 μm to about 75 μm. For example, the particle size of the inorganic filler can be about 1, about 5, about 10, about 15, about 20, about 25, about 30, about 40, about 50, about 60, about 70, about 75, about 80, about 85, about 90, about 100, about 110, about 120, about 130, about 140, about 150, about 160, about 170, about 180, about 190, or about 200 μm.

The inorganic filler is not the same as the inorganic binder. Thus, in embodiments the inorganic filler is substantially free of borate salts, alkali metal silicates, and alkaline earth metal silicates. As used herein, "substantially free of borate salts," "substantially free of alkali metal silicates," and "substantially free of alkaline earth metal silicates" means that the inorganic filler does not contain significant amounts of purposely added borate salts, for example, sodium metaborate, sodium tetraborate, borax decahydrate, boric oxide, or lithium borate; a significant amount of purposely added alkali metal silicates, for example, sodium silicate, potassium silicate, or lithium silicate; or a significant amount of purposely added alkaline earth metal silicates, for example, magnesium silicate, calcium silicate, or beryllium silicate. Thus, incidental or background amounts of borate salts and metal silicates (e.g., less than 3 wt. %, less than 2 wt. %, or less than 1 wt. %, based on the total weight of the dry coating) may be present in the inorganic filler and be within the scope of the disclosure. Inorganic fillers comprising glass and clays may include aluminum silicate and/or borosilicate and be within the scope of the disclosure.

The amount of inorganic filler in the coating composition or layer according to the present disclosure is not particularly limited. In embodiments, the inorganic filler can be included in an amount up to about 90 wt. %. For example, the inorganic filler can be included in an amount ranging from about 10 wt % to about 90 wt %, about 25 wt. % to about 75 wt. %, about 40 wt. % to about 60 wt. %, or about 30 wt. % to about 50 wt. %, for example, about 5, about 10, about 15, about 20, about 22, about 25, about 27, about 30, about 32, about 35, about 37, about 40, about 42, about 45, about 47, about 50, about 55, about 60, about 65, about 70, about 75, about 80, about 85, or about 90 wt. %, based on the total weight of the dry coating.

The coating composition and coating layer can optionally further include one or more components, such as, dispersants, pigments, surfactants, pH modifiers, buffering agents, viscosity modifiers, stabilizers, defoamers, flow modifiers, and combinations thereof.

In embodiments, the coating composition includes one or more dispersants. Suitable dispersants include, for example, tetrapotassium pyrophosphate (TKPP) (FMC Corp.), sodium polycarboxylates such as Tamol® 731A (Rohm & Haas) and nonionic surfactants such as Triton™ CF-10 alkyl aryl polyether (Dow Chemicals). In embodiments, the coating composition includes a dispersant selected from nonionic surfactants such as Triton™ CF-10 alkyl aryl polyether (Dow Chemicals).

Optionally, the coating composition and coating layer may further include minor amounts of a component to impart increased water resistance to the coating. For example, a component to impart increased water resistance can be included in the coating composition and/or coating layer in an amount of about 3 wt. % or less, about 2 wt. % or less, or about 1 wt. % or less. Suitable components that impart increased water resistance include, for example, siloxanes that impart hydrophobicity to the coating. Suitable siloxanes include, but are not limited to, polymethylhydrosiloxane, polydimethylsiloxane, and combinations thereof.

The curable coating composition may be prepared by admixing the inorganic binder, and other optional components (e.g. the inorganic filler) using conventional mixing techniques. Typically, the coating particles or solids are suspended in an aqueous carrier. Typically, the inorganic binder(s) including the borate salt and metal silicate, and, optionally, the inorganic filler are added to and mixed with the aqueous carrier, followed by the other optional components in descending order according to the dry wt. % amount. The coating composition can then be deposited on the fibrous panel to form the coating layer.

Alternatively, the coating layer may be prepared by depositing the inorganic binder and, when present, the inorganic filler step-wise to the fibrous panel. In such embodiments, the inorganic binder is added and mixed with an aqueous carrier, followed by the other optional components as described above, to form a binder dispersion. Similarly, the inorganic filler can be added and mixed with an aqueous carrier, followed by the other optional components as described above, to form a filler dispersion. The binder dispersion and the filler dispersion can then be deposited on the fibrous panel step-wise. For example, in some embodiments, the binder dispersion is deposited on the fibrous panel, followed by the filler dispersion. In another embodiment, the filler dispersion is deposited on the fibrous panel, followed by the binder dispersion.

The solid content of the coating composition of the disclosure, that is, the binder dispersion and/or the optional filler dispersion, can be as high as practical for a particular application. A limiting factor regarding the choice and amount of liquid carrier used is the viscosity obtained with the required amount of solids. Spraying is the most sensitive to viscosity, while other deposition methods are less sensitive. The effective range for the solid content of the coating composition is about 15 wt. % or more, for example, about 20 wt. % or more, about 25 wt. % or more, about 30 wt. % or more, about 35 wt. % or more, about 40 wt. % or more, or about 45 wt. % or more, based on the total coating composition prior to any drying and/or curing step. That is, the effective range for solid content of the coating composition, as defined herein, includes any aqueous carrier or solvent, such as water, that is typically evaporated from the final, dry coating layer. Alternatively, or in addition, the solid content of the coating composition is about 80 wt. % or less, or about 75 wt. % or less, or about 70 wt. % or less, based on the total coating composition prior to any drying and/or curing step. Thus, the solid content of the coating composition can be bounded by any two of the above endpoints recited for the solid content of the coating composition. For example, the solid content of the coating composition can be from about 15 wt. % to about 80 wt. %, from about 35 wt. % to about 80 wt. %, from about 45 wt. % to about 75 wt. %, or from about 45 wt. % to about 70 wt. %.

For example, a coating composition including 60 wt. % of a 37.5% solids sodium silicate solution, 5 wt. % sodium tetraborate, and 35 wt. % additional water, has a solids content of about 27.5 wt. %, based on the total coating composition prior to any drying and/or curing step, made up of 100% inorganic binders (i.e. sodium silicate and sodium tetraborate). Thus, when the coating is dried and/or cured, the inorganic binder makes up about 100 wt. % of the coating, based on the total weight of the dry coating.

In a further example wherein an inorganic filler is included, a coating composition including 60 wt. % of a 37.5% solids sodium silicate solution, 5 wt. % sodium tetraborate, 5 wt. % kaolin clay, 20 wt. % calcium carbonate, and 10 wt. % additional water, has a solids content of about 52.5 wt. %, based on the total coating composition prior to any drying and/or curing step, made up of about 27.5% inorganic binder (i.e. sodium silicate and sodium tetraborate) and about 25% inorganic filler (i.e. kaolin clay and calcium carbonate). Thus, when the coating is dried and/or cured, the inorganic binder makes up about 52.4 wt. % of the coating based on the total weight of the dry coating, and the inorganic filler makes up about 47.6 wt. % of the coating, based on the total weight of the dry coating.

Thus, the disclosure provides a curable coating composition for improving the sag resistance of a fibrous panel, the curable coating composition including about 10 to about 90 wt. % inorganic binder, based on the total weight of the dry coating, wherein the inorganic binder comprises a borate salt and a metal silicate selected from the group consisting of an alkali metal silicate, an alkaline earth metal silicate and combinations thereof, and the inorganic binder is water soluble.

Optionally, the curable coating composition of the disclosure can further include up to about 90 wt % inorganic filler based on the total weight of the dry coating, wherein the inorganic binder and the inorganic filler are not the same.

Fibrous Panel

The disclosure is further directed to a panel (e.g., an acoustical panel, a ceiling tile) coated with the coating composition of the disclosure. A coated panel 10 in accordance with one aspect of the present disclosure, as illustrated schematically in FIG. 1, comprises a panel core 20 having a backing side 30 and a facing side 40. The panel optionally further comprises a backing layer 35 in contact with the backing side 30, and/or a facing layer 45 in contact with the facing side 40. A back coating layer 50 is disposed on, for example, in contact with the backing side 30 or optional backing layer 35. Optionally, a further front coating layer 60 is disposed on or over, for example, the facing side 40 or optional facing layer 45.

The back coating layer 50 beneficially counteracts the sagging force of gravity in humid conditions, thus the coating is applied to the backing side 30 (or backing layer 35 if present) of the panel core 20. The backing side 30 may be the side that is directed to the plenum above the panel in a suspended ceiling tile system. The coated panel 10 may be an acoustical panel for attenuating sound. The backing side 30 may be the side that is directed to a wall behind the panel in applications where an acoustical panel is provided on walls.

An illustrative procedure for producing the panel core 20 is described in U.S. Pat. No. 1,769,519. In one aspect, the panel core 20 comprises a mineral wool fiber and a starch. In another aspect of the present disclosure, the starch component can be a starch gel, which acts as a binder for the mineral wool fiber, as is disclosed in U.S. Pat. Nos. 1,769,519, 3,246,063, and 3,307,651. In a further aspect of the present disclosure, the panel core 20 can comprise a glass fiber panel.

The panel core 20 of the coated panel of the disclosure can also include a variety of other additives and agents. For example, the panel core 20 can include a calcium sulfate material (such as, stucco, gypsum and/or anhydrite), boric acid and sodium hexametaphosphate (SHMP). Kaolin clay and guar gum may be substituted for stucco and boric acid when manufacturing acoustical tile.

The core of the coated panel of the present disclosure can be prepared using a variety of techniques. In one embodiment, the panel core 20 is prepared by a wet- or water-felted process, as is described in U.S. Pat. Nos. 4,911,788 and 6,919,132. In another embodiment, the panel core 20 is prepared by combining and mixing starch and a variety of additives in water to provide a slurry. The slurry is heated to cook the starch and create the starch gel, which is then mixed with mineral wool fiber. This combination of gel, additives, and mineral wool fiber (referred to as "pulp") is metered into trays in a continuous process. The bottom of the trays into which the pulp is metered can optionally contain a backing layer 35 (for example, a bleached paper, unbleached paper, or kraft paper-backed aluminum foil, hereinafter referred to as kraft/aluminum foil), which serves to aid in the release of the material from the tray, but also remains as part of the finished product. The surface of the pulp can be patterned, and the trays containing the pulp can be subsequently dried, for example, by transporting them through a convection tunnel dryer. Next, the dried product or slab can be fed into a finishing line, where it may be cut to size to provide the panel core 20. The panel core 20 can then be converted to the panel of the present disclosure by application of the coating composition of the disclosure. The coating composition is preferably applied to the panel core 20 after the core has been formed and dried. In yet another embodiment, the panel core 20 is prepared according to the method described in U.S. Pat. No. 7,364,015, which is incorporated by reference herein. Specifically, the panel core 20 comprises an acoustical layer comprising an interlocking matrix of set gypsum, which can be a monolithic layer or can be a multi-layer composite. Desirably, the panel core 20 can be prepared on a conventional gypsum wallboard manufacturing line, wherein a ribbon of acoustical panel precursor is formed by casting a mixture of water, calcined gypsum, foaming agent, and optionally cellulosic fiber (e.g., paper fiber), lightweight aggregate (e.g., expanded polystyrene), binder (e.g., starch, latex), and/or enhancing material (e.g., sodium trimetaphosphate) on a conveyor belt.

In embodiments, the panel core comprises a backing sheet (e.g., paper, metallic foil, or combination thereof), optionally coated with scrim layer (e.g., paper, woven or nonwoven fiberglass) and/or densified layer precursor comprising calcined gypsum and having a density of at least about 35 lbs/ft$^3$. In yet another embodiment, the panel core 20 is prepared according to the wet-felting process. In the wet-felting process, an aqueous slurry of the panel-forming materials including mineral wool, expanded perlite, starch and minor additives, are deposited onto a moving wire screen, such as a Fourdrinier or cylinder former. On the wire screen of a Fourdrinier, a wet mat is formed by dewatering the aqueous slurry by gravity and then optionally by vacuum suction. The wet mat is pressed to a desired thickness between press rolls for additional dewatering. The pressed mat is dried in ovens and then cut to produce acoustical panels. The panel core 20 can then be converted to the panel of the present disclosure by application of the coating composition of the disclosure. The coating composition is preferably applied to the panel core 20 after the core has been formed and dried.

In a further embodiment, the panel core 20 can include, as a preservative, one or more formaldehyde-free biocides, as described in U.S. Patent Application Publication 2007/0277948 A1, which is incorporated by reference herein. Suitable formaldehyde-free biocides include 1,2-benzisothiazolin-3-one, available as Proxel® GXL or Proxel® CRL (ARCH Chemicals), Nalcon® (Nalco), Canguard™ BIT (Dow Chemical), and Rocima™ BT 1S (Rohm & Haas). Other isothiazolin-3-ones include blends of 1,2-benzisothiazolin-3-one and 2-methyl-4-isothiazolin-3-one, available as Acticide® MBS (Acti-Chem). Additional isothiazolin-3-ones include 5-chloro-2-methyl-4-isothiazolin-3-one, 2-methyl-4-isothiazoline-3-one, and blends thereof. Blends of 5-chloro-2-methyl-4-isothiazolin-3-one and 2-methyl-4-isothiazoline-3-one are available as Kathon™ LX (Rohm & Haas), Mergal® K14 (Troy Chemical), and Amerstat® 251 (Drew Chemical). Another suitable formaldehyde-free biocide includes zinc 1-hydroxy-2(1H)-pyridinethione, available as Zinc Omadine® (ARCH Chemicals), and is preferably effective in both the dry state and the wet state. Zinc 1-hydroxy-2(1H)-pyridinethione can also be employed with zinc oxide, available as Zinc Omadine® emulsion. Other suitable formaldehyde-free biocides include 2-n-octyl-4-isothiazolin-3-one, available as Kathon™ 893 and Skane® M-8 (Rohm & Haas), and 2-(4-thiazolyl)-benzimidazole, available as Metasol® TK-100 (LanXess).

As previously discussed, the coated panel in accordance with the present disclosure can optionally include the backing layer 35. Numerous materials can be employed as the backing layer 35, including unbleached paper, bleached paper, kraft/aluminum foil, and the like. A flame resistant back coating optionally can be applied in combination with bleached or unbleached paper backing to improve the products surface burning characteristics. The flame resistant back coating can include a variety of components, such as, for example, water, a flame retardant, and a biocide. The backing layer 35 may also be employed for improving sag resistance and/or sound control. In addition, a fill coating or a plurality of fill coatings may also be applied to the backing layer 35. The fill coating can include a variety of components, such as, for example, water, fillers, binders, and various other additives, such as defoamers, biocides, and dispersants. Generally, when a fill coating is used, the fill coating typically is applied after the metal silicate coating of the disclosure.

The coating composition of the present disclosure is suitable for use in coating a front and/or back side of a panel such as a fibrous panel (e.g., an acoustical panel or ceiling tile). The coating composition of the disclosure can be used with acoustical panels known in the art and prepared by methods known in the art, including acoustical panels prepared by a water-felting method. For example, acoustical panels and the preparation thereof are described in, for example, U.S. Pat. Nos. 1,769,519, 3,246,063, 3,307,651, 4,911,788, 6,443,258, 6,919,132, and 7,364,015, each of which are incorporated herein by reference. Suitable commercial ceiling tiles for use in accordance with the present disclosure include, for example, Radar™ brand ceiling tiles available from USG Interiors, Inc. of Chicago, Ill. The Radar™ brand tile is a water-felted slag wool or mineral wool fiber panel having a 5/8" thickness and the following composition: 1-75 wt. % slag wool fiber, 5-75 wt. % expanded perlite, 1-25 wt. % cellulose, 5-15 wt. % starch, 0-15 wt. % kaolin, 0-80 wt. % calcium sulfate dehydrate, less than 2 wt. % limestone or dolomite, less than 5 wt. % crystalline silica, and less than 2 wt. % vinyl acetate polymer or ethylene vinyl acetate polymer. The diameters of the mineral wool fibers vary over a substantial range, e.g., 0.25 to 20 microns, and most of the fibers are in the range of 3 to 4 microns in diameter. The lengths of the mineral fibers range from about 1 mm to about 8 mm.

Methods of Coating a Fibrous Panel

The disclosure provides a method of coating a fibrous panel including providing a fibrous panel having a backing side and an opposing facing side, and depositing a coating layer on at least one side of the fibrous panel, the coating layer including an inorganic binder, wherein the inorganic binder is present in an amount between about 10 and 100 wt. %, based on the total weight of the dry first coating layer, the inorganic binder includes a borate salt and a metal silicate selected from the group consisting of an alkali metal silicate, an alkaline earth metal silicate, and combinations thereof, and the inorganic binder is water soluble. In embodiments, the coating is deposited on the backing side of the fibrous panel to provide a back coating. As used herein, "back coating" refers to a borate salt and metal silicate coating provided on the backing side of the ceiling tile or fibrous panel.

In embodiments, the coated fibrous panel includes one coating layer comprising an inorganic binder according to the disclosure. In embodiments, the coated fibrous panel includes at least 2, 3, or 4 coating layers up to 8, 9, or 10 coating layers, for example, 1, 2, 3, 4, 5, 6, 7, 8, 9, or 10 coating layers comprising an inorganic binder according to the disclosure. Each coating layer of the disclosure includes an inorganic binder, wherein the inorganic binder is present in an amount ranging from about 10 and 100 wt. %, based on the total weight of the dry coating layer, the inorganic binder includes a borate salt and a metal silicate selected from the group consisting of an alkali metal silicate, an alkaline earth metal silicate, and combinations thereof, and the inorganic binder is water soluble.

In embodiments wherein at least a second coating layer is applied to the fibrous panel, the method of coating further includes depositing a second coating layer in contact with or over the first coating layer, the second coating layer including a second inorganic binder, wherein the second inorganic binder is present in an amount between 10 and 100 wt. %, based on the total weight of the dry second layer, the second inorganic binder includes a borate salt and a metal silicate selected from the group consisting of an alkali metal silicate, an alkaline earth metal silicate, and combinations thereof, and the second inorganic binder is water soluble.

In embodiments wherein more than two coating layers are applied, the subsequent coating layer can be provided such that it is in contact with or over the previously deposited coating layer. That is, for example, a third coating layer can be in contact with the second coating layer, a fourth coating layer can be in contact with the third coating layer, or a fifth coating layer can be in contact with the fourth coating layer.

In embodiments, the first and/or second coating layer(s), and any subsequent coating layer deposited thereon (e.g. the third, fourth, fifth, sixth, seventh, eighth, ninth, and/or tenth coating layers), can optionally further include an inorganic filler, wherein the inorganic filler is present in an amount up to about 90 wt. %, based on the weight of the dry coating layer, and the inorganic binder and inorganic filler are not the same.

In embodiments wherein the inorganic filler is present in the coating layer, the method of the disclosure can further include mixing the inorganic binder and the inorganic filler to form a curable coating composition prior to depositing the coating layer. That is, the inorganic binder and the inorganic filler, when present, can be pre-mixed, and therefore, deposited concurrently in a mixture. In other embodiments wherein the inorganic filler is present in the coating layer, the inorganic filler and inorganic binder are deposited stepwise from an inorganic binder dispersion and an inorganic filler dispersion. Optionally, the inorganic filler is deposited first and the inorganic binder is deposited subsequently and in contact with the first, inorganic filler layer. Without intending to be bound by theory, it is believed that depositing the inorganic filler first enhances retention of the filler in the matrix formed by crosslinking/dehydration of the borate and silicate binder and, further, facilitates crosslinking/dehydration of the borate and silicate binder. In embodiments, a dispersant may be mixed into the curable coating composition and deposited concurrently with the inorganic binder and inorganic filler. A dispersant may also be included in the inorganic binder dispersion and/or inorganic filler dispersion when the binder and filler are deposited step-wise.

The coating composition can be applied to one or more surfaces of a panel, preferably a fibrous acoustical panel or ceiling tile substrate, using a variety of techniques readily known to and available to those skilled in the art. Such techniques include, for example, airless spraying systems, air assisted spraying systems, and the like. The coating may be applied by such methods as roll coating, flow coating, flood coating, spraying, curtain coating, extrusion, knife coating and combinations thereof. The borate salt and metal silicate coating may be applied to have a coat weight in an amount on wet basis of from about 10 g/ft$^2$ to about 40 g/ft$^2$, from about 15 g/ft$^2$ to about 35 g/ft$^2$, and from 15 g/ft$^2$ to about 25 g/ft$^2$. The aqueous coating composition may have any suitable solids content, for example, in a range of about 15 wt. % to about 80 wt. %, from about 35 wt. % to about 80 wt. %, from about 45 wt. % to about 75 wt. %, or from about 45 wt. % to about 70 wt. %. The borate salt and metal silicate coating may be applied from a 65% solids composition to have a coat weight on a dry basis of about 0.014 lb/ft$^2$ (about 6.5 g/ft$^2$) to about 0.065 lb/ft$^2$ (about 29.3 g/ft$^2$), about 0.020 lb/ft$^2$ (about 9.8 g/ft$^2$) to about 0.050 lb/ft$^2$ (about 22.8 g/ft$^2$), or about 0.020 lb/ft$^2$ (about 9.8 g/ft$^2$) to about 0.036 lb/ft$^2$ (about 16.3 g/ft$^2$). In embodiments, the borate salt and metal silicate coating may be applied from a 45 wt. % solids composition to have a coat weight on a dry basis of about 0.010 lb/ft² (about 4.5 g/ft²) to about 0.040 lb/ft² (about 18 g/ft²), about 0.015 lb/ft² (about 6.8 g/ft²) to about 0.035 lb/ft² (about 15.8 g/ft²), or about 0.015 lb/ft² (about 6.8 g/ft²) to about 0.025 lb/ft² (about 11.3 g/ft²). In an embodiment, the coating composition of the disclosure is applied to the backing side 30 of the panel. In another embodiment, the coating composition of the disclosure is applied to the backing layer 35 of the panel.

After the curable coating composition of the disclosure has been applied to the panel either as a premixed curable composition or by step-wise deposition of the inorganic binder and the optional inorganic filler, the coated fibrous panel can be dried or cured. As used herein, "curing" refers to any chemical or morphological change that is sufficient to alter the properties of the binder, such as, for example, via covalent chemical reaction (e.g., condensation reaction), hydrogen bonding, and the like. The coated fibrous panel can be dried after each individual coating layer is applied (e.g., after a single deposition of a pre-mixed composition of the inorganic binder and the inorganic filler), or after all coating layers have been applied (e.g., after multiple depositions of a pre-mixed composition of the inorganic binder and the inorganic filler, or after step-wise addition of compositions containing the inorganic binder or the inorganic filler). Drying the fibrous panel assists in the formation of a crosslinked/dehydrated solid borate salt and metal silicate coating layer. In embodiments, the coated fibrous panel is dried by air drying. That is, the fibrous panel is allowed to dry under ambient, room temperature conditions without the application of heat or forced air. Alternatively, or in addition, in embodiments, the composition can be dried by heating the coated fibrous panel. Without intending to be bound by theory, heating is believed to effect curing and crosslinking/dehydration of the inorganic borate and silicate binder thereby strengthening the borate and silicate structural matrix. Further, when an inorganic filler is present, heating is believed to enhance retention of the inorganic filler within the borate and silicate structural matrix. Drying the resulting product removes any water used as a carrier for the coating composition or any of the components thereof and converts the inorganic borate silicate binder into a structural, rigid network capable of providing enhanced structural rigidity to the panel.

When the coated fibrous panel is dried by heating, the duration and temperature of heating will affect the rate of drying, ease of processing or handling, and property development of the heated substrate. Heat treatment at from about 100° C. to about 500° C. (e.g., about 120° C., about 150° C. to about 500° C., or about 175° C. to about 400° C., or about 200° C. to about 300° C., or about 300° C. to about 500° C.) for a period of from about 3 seconds to about 15 minutes are suitable for drying the coated fibrous panel(s) of the disclosure. For acoustical panels, suitable temperatures can be in a range of from about 300° C. to about 500° C., or about 350° C. to about 450° C. (about 600 to about 800° F.). Generally, heating is conducted until a coating surface temperature of at least about 200° C. to 240° C. (about 390 to about 465° F.) is achieved, as this is indicative of a full cure. In embodiments, the method includes heating the coated fibrous panel to a surface temperature of at least about 250° F. (about 120° C.), at least 300° F. (about 150° C.), at least 350° F. (about 175° C.), up to about 400° F. (about 205° C.), about 450° F. (about 230° C.), or about 500° F. (about 260° C.).

The drying and curing functions can be effected in two or more distinct steps, if desired. For example, the curable coating composition can be first heated at a temperature, and for a time, sufficient to substantially dry, but not to substantially cure the composition, and then heated for a second time, at a higher temperature, and/or for a longer period of time, to effect full curing. Such a procedure, referred to as "B-staging," can be used to provide coated panels in accordance with the disclosure.

In embodiments, the method further includes depositing a chemical curing layer. The methods of the disclosure can utilize chemical curing in addition to or even in lieu of drying and/or heat curing. Chemical curing may include depositing a multivalent metal compound or an acidic solution to form cured borate salt and metal silicate coatings by precipitation of insoluble metal silicate compounds from solution to provide a solid layer. In embodiments, the coating layer(s) may be further coated with a solution of a multivalent metal or acid. In embodiments wherein the inorganic binder and optional inorganic filler are deposited step-wise, the multivalent metal or acid may be provided with the inorganic filler and/or the inorganic binder and deposited concurrently therewith. In embodiments wherein multiple pre-mixed coating layers are applied, a chemical curing layer can be applied between each coating layer.

Without intending to be bound by theory, it is believed that the multivalent metal displaces any monovalent cations (e.g., sodium, lithium, or potassium) in the interstitial spaces of the inorganic network accelerating curing and forming an insoluble silicate coating. The multivalent metal can be provided as a bivalent and/or trivalent metal salt. Suitable multivalent metals include, but are not limited to, $Be^{2+}$, $Mg^{2+}$, $Ca^{2+}$, $Sr^{2+}$, $Ba^{2+}$, $Zn^{2+}$, $Cu^{2+}$, $Fe^{2+}$, $Fe^{3+}$, and $Al^{3+}$. In embodiments, the multivalent metal includes a metal salt having a cation selected from the group consisting of beryllium, magnesium, calcium, strontium, barium, zinc, copper, iron, aluminum, and combinations thereof. In embodiments, the multivalent metal includes a metal salt having a cation selected from the group consisting of calcium, magnesium, zinc, copper, iron, aluminum, and combinations thereof. In embodiments, the multivalent metal includes an alkaline earth metal salt having a cation selected from the group consisting of beryllium, magnesium, calcium, strontium, barium, and combinations thereof. Suitable salts include borates, chlorides, carbonates, sulfates, and combinations thereof. In embodiments, the multivalent metal is provided in the form of an oxide, hydroxide or combinations thereof. Without intending to be bound by theory, it is believed that slower dissolving compounds, for example carbonate salts, oxides, hydroxides, and the like may be used to provide stable formulations.

In embodiments wherein an acid is used for chemical curing, the acid may be any acid, for example an organic acid or a mineral acid including but not limited to organic acids and mineral acids selected from the group consisting of acetic acid, sulphuric acid, phosphoric acid, and combinations thereof.

In embodiments, the multivalent metal compound or acid can be present in the composition for forming the chemical curing layer in any suitable amount for enhancing curing of the coating layer(s), for example, in an amount ranging from about 5 wt. % to about 30 wt. %, about 10 wt. % to about 25 wt. %, or about 15 wt. % to about 20 wt. %, for example, about 5 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 25 wt. %, or about 30 wt. %, based on the weight of the composition for forming the chemical curing layer (prior to any drying and/or curing step).

In embodiments, the composition for chemical curing can further include an inorganic filler. Suitable inorganic fillers include those that may be included in the coating layers, such as, for example, clay (e.g. kaolin clay or bentonite clay), mica, sand, barium sulfate, silica, talc, magnesia, olivine, dolomite, tremolite, xonolite, vermiculite, gypsum, perlite, limestone (calcite or aragonite), magnesite, wollastonite, zinc oxide, zinc sulfate, hollow beads, bentonite salts, fly ash, bottom ash, coal ash, steel slag, iron slag, limestone slag, zeolite, and combinations thereof.

In embodiments, the inorganic filler can be present in the composition for forming the chemical curing layer in an amount ranging up to about 50 wt. %, about 5 wt. % to about 45 wt. %, about 10 wt. % to about 40 wt. %, about 15 wt. % to about 25 wt. %, for example about 5 wt. %, about 10 wt. %, about 15 wt. %, about 20 wt. %, about 25 wt. %, about 30 wt. %, about 35 wt. %, about 40 wt. %, about 45 wt. %, or about 50 wt. %, based on the weight of the composition for forming the chemical curing layer (prior to any drying and/or curing step).

In embodiments, the chemical curing layer includes calcium chloride and an inorganic filler, such as clay.

The multivalent metal compound-containing curing composition can be applied by any technique known in the art, for example, airless spraying systems, air assisted spraying systems, and the like. The multivalent metal compound coating may be applied by such methods as roll coating, flow coating, flood coating, spraying, curtain coating, extrusion, knife coating and combinations thereof. Solutions of multivalent metal compounds, including but not limited to calcium chloride, magnesium chloride, and combinations thereof, can be sprayed onto a hot panel coated with the curable coating composition. Without intending to be bound by theory, it is believed that there is a minimum amount of multivalent metal salt required to drive the chemical curing reaction to completion. Suitable coat weights of multivalent metal salts for driving the chemical curing reaction to completion are at least about 2.5 mmol/ft$^2$, or at least about 5 mmol/ft$^2$ on a wet or dry basis. The multivalent metal may be deposited as a salt, at a coat weight (on a dry or wet basis) in the range of about 2.5 mmol/ft$^2$ to about 35 mmol/ft$^2$, or about 5 mmol/ft$^2$ to about 30 mmol/ft$^2$, from about 7 mmol/ft$^2$ to about 20 mmol/ft$^2$, or from about 9 mmol/ft$^2$ to about 15 mmol/ft$^2$.

Optionally, after the solution of a multivalent metal compound is sprayed onto the panel, the panel can be dried and heated again, for example, to a temperature in a range of 100° F. to 600° F. (about 35° C. to about 315° C.), about 200° F. to about 500° F. (about 90° C. to about 260° C.), about 300° F. to about 400° F. (about 150° C. to about 205° C.), for example, about 100° F. (about 35° C.), about 200° F. (about 90° C.), about 300° F. (about 150° C.), about 400° F. (about 205° C.), about 450° F. (about 230° C.), about 500° F. (about 260° C.), about 550° F. (about 290° C.), or about 600° F. (about 315° C.) for 20 seconds to five minutes. Alternatively, or in combination with heating, after the solution of a multivalent metal compound is sprayed onto the panel, the panel can be dried by air drying.

The coated panel of the disclosure has increased resistance to permanent deformation (sag resistance), as determined according to ASTM C367M-09.

Sag Test—ASTM C367M-09

Sag of the ceiling tiles can be measured according to ASTM C367M-09. Briefly, ceiling tiles are placed in a testing rack that mimics a ceiling grid. The vertical position of the geometric center of the panel as set in the rack is measured to determine the initial position of the product following a 1 hour conditioning of 70° F. (21° C.)/50% R.H. Once the initial position of the tile the panel is measured, the tile is exposed to a variety of environmental conditions that comprise a single test cycle. In particular, in the examples described below, a cycle of 12 hours at 104° F. (40° C.)/50% R.H. followed by 12 hours at 70° F. (21° C.)/50% R.H. is completed 3 times, with the center position being measured after the completion of each cycle. The sag is reported in two ways. The "Total Movement" is determined by taking the vertical position difference between the initial position of the ceiling tile and the final position of the tile after the three cycles are completed. The "Final Position" is determined by taking the final vertical position of the tile. Unless specified otherwise, sag is listed in units of inches for 2'×4' tiles. Suitable tiles of the disclosure demonstrate less sag than uncoated tiles, for example, a sag of less than about 1.0 inch (about 2.5 cm), or less than about 0.8 inches (about 2.0 cm), or less than about 0.6 inches (about 1.5 cm), or less than about 0.5 inches (about 1.3 cm), or less than about 0.4 inches (about 1.0 cm), or less than about 0.3 inches (about 0.75 cm), or less than about 0.2 inches (about 0.50 cm), or less than about 0.1 inches (about 0.25 cm).

The foregoing description is given for clearness of understanding only, and no unnecessary limitations should be understood therefrom, as modifications within the scope of the invention may be apparent to those having ordinary skill in the art.

The compositions, panels, and methods in accordance with the disclosure can be better understood in light of the following examples, which are merely intended to illustrate the compositions, panels, and methods of the disclosure and are not meant to limit the scope thereof in any way.

EXAMPLES

Example 1—Preparation of a Coated Fibrous Panel

A series of coated acoustical ceiling tiles were prepared and tested for sag resistance. Unless specified otherwise, all ceiling tiles used in the Examples are Radar™ brand ceiling tiles available from USG Interiors, Inc. of Chicago, Ill. The Radar™ brand tile is a water-felted slag wool or mineral wool fiber panel having a ⅝" thickness and the following composition: 1-75 wt. % slag wool fiber, 5-75 wt. % expanded perlite, 1-25 wt. % cellulose, 5-15 wt. % starch, 0-15 wt. % kaolin, 0-80 wt. % calcium sulfate dehydrate, less than 2 wt. % limestone or dolomite, less than 5 wt. % crystalline silica, and less than 2 wt. % vinyl acetate polymer or ethylene vinyl acetate polymer. The diameters of the mineral wool fibers vary over a substantial range, e.g., 0.25 to 20 microns, and most of the fibers are in the range of 3 to 4 microns in diameter. The lengths of the mineral fibers range from about 1 mm to about 8 mm.

The ceiling tiles were cut and divided in 6"×24" sample panels. Half of the sample panels were coated using a coating composition including an inorganic binder according to the disclosure (Example 1), while half of the sample panels were coated with a comparative coating composition containing an alkali metal silicate but lacking a borate salt (Comparative Example 1). After all sample panels were roll coated to provide a back coating, they were dried for 3 minutes at 550° F. (about 290° C.).

The coating compositions are shown in terms of vol. % of the aqueous coating composition and corresponding wt. % of the aqueous coating composition in Table 1, below:

TABLE 1

Aqueous Coating Compositions

| Ingredient | Example 1 (vol. %) | Example 1 (wt. % solids) | Comparative Example 1 (vol. %) | Comparative Example 1 (wt. % solid) |
|---|---|---|---|---|
| Sodium Silicate Solution (37.5% solids) | 59.0 | 22.1 | 41.0 | 15.4 |
| Sodium Tetraborate Pentahydrate | 2.2 | 2.2 | 0 | — |
| Calcium Carbonate | 20.0 | 20.0 | 40.0 | 40.0 |
| Kaolin Clay | 5.0 | 5.0 | 5.0 | 5.0 |
| Dispersant | 0.2 | — | 0.2 | — |
| Water | 13.6 | — | 13.8 | — |

The inorganic binder of Example 1 included sodium tetraborate pentahydrate and a sodium silicate solution (N Sodium Silicate Solution, 3.22 $SiO_2$:$Na_2O$, 37.5% solids, PQ Corporation, Valley Forge, Pa.). The inorganic binder was applied in combination with inorganic filler and a dispersant. The coating composition of Example 1 included 59% of the 37.5% solids sodium silicate solution, 2.20% sodium tetraborate pentahydrate, 20% calcium carbonate, 5% kaolin clay, 0.20% dispersant, and 13.6% additional water.

Thus, the coating composition of Example 1 had a solids content of about 49.3 wt. %, based on the total coating composition prior to any drying and/or curing step, made up of 24.3% inorganic binder (i.e. sodium silicate and sodium tetraborate) and 25% inorganic filler (i.e. calcium carbonate and kaolin clay). Thus, when the coating was dried and/or cured, the inorganic binder made up about 49.3 wt. % of the coating, based on the total weight of the dry coating, and the inorganic filler made up about 50.7 wt % of the coating, based on the total weight of the dry coating.

In Comparative Example 1, the coating composition included 41% of the 37.5% solids sodium silicate solution, 40% calcium carbonate, 5% kaolin clay, 0.20% dispersant, and 13.8% additional water.

Thus, the coating composition of the Comparative Example 1 had a solids content of about 60.4 wt %, based on the total coating composition prior to any drying and/or curing step, made up of about 15.4% inorganic binder (i.e. sodium silicate), and 45% inorganic filler (i.e. calcium carbonate and kaolin clay). Thus, when the coating was dried and/or cured, the inorganic binder made up about 25.5 wt % of the coating, based on the total weight of the dry coating, and the inorganic filler made up about 74.5 wt % of the coating, based on the total weight of the dry coating.

The amounts of inorganic binder and inorganic filler of the two coatings, based on the total weight of the dry coating are compared in Table 2, below.

TABLE 2

Dried Coating Compositions

| Coating Component | Example 1 (wt. %, total weight of the dry coating) | Comparative Example 1 (wt. %, total weight of the dry coating) |
|---|---|---|
| Inorganic Binder | 49.3 | 25.5 |
| Inorganic Filler | 50.7 | 74.5 |

After being dried for 3 minutes at 550° F. (about 290° C.), the tiles were coated with a chemical curing layer made up of a solution of 15 wt. % calcium chloride and 20 wt. % clay and dried at 550° F. (about 290° C.) for 30 seconds.

Example 2—Sag Resistance Testing of the Coated Fibrous Panels

The fibrous panels of Example 1 were tested for sag according to ASTM C367M-09, as described above, using 100 total sample panels for each coating composition. Results for the sag test are shown in Table 3, below.

TABLE 3

Sag Resistance Data

| Coating Composition | Test No. (50 samples each) | Total Movement (in.) |
|---|---|---|
| Example 1 | 1 | 0.37 |
|  | 2 | 0.30 |
| Comparative Example 1 | 1 | 0.76 |
|  | 2 | 0.57 |

As shown in Table 1, the panels coated with a coating having an inorganic binder including a borate salt and metal silicate according to the disclosure, had an at least about 35% (and up to about 60%) reduction in sag, compared to the panels coated with a coating comprising only a metal silicate inorganic binder.

Thus, Examples 1 and 2 demonstrate coated fibrous panels and methods of making same, as well as curable coating compositions for improving the sag resistance of a fibrous panel, according to the disclosure. Further, Examples 1 and 2 demonstrate the coated fibrous panel of the disclosure has significantly improved sag resistance when compared to a similar coated fibrous panel lacking a borate salt inorganic binder.

What is claimed:

1. A coated fibrous panel comprising:
   a fibrous panel comprising a starch and a mineral wool fiber, the fibrous panel having a backing side and an opposing facing side, the fibrous panel having a cured coating layer disposed on at least one side of the fibrous panel, the cured coating layer comprising:
   10 to 100 wt. % inorganic binder, based on the total weight of the cured coating layer,
   wherein the inorganic binder comprises a borate salt and a metal silicate selected from the group consisting of alkali metal silicates, alkaline earth metal silicates, and combinations thereof, and the inorganic binder is water soluble.

2. The fibrous panel of claim 1, wherein the coating layer further comprises up to 90 wt. % inorganic filler, based on the total weight of the cured coating layer, and the inorganic binder and the inorganic filler are not the same.

3. The fibrous panel of claim 1, wherein the alkali metal silicate or the alkaline earth metal silicate is selected from the group consisting of sodium silicate, potassium silicate, lithium silicate, magnesium silicate, calcium silicate, beryllium silicate, and combinations thereof.

4. The fibrous panel of claim 1, wherein the borate salt is selected from the group consisting of sodium metaborate, sodium tetraborate, potassium tetraborate, potassium pentaborate, ammonium pentaborate, borax decahydrate, boric oxide, lithium borate, and combinations thereof.

5. The fibrous panel of claim 1, wherein the inorganic binder comprises sodium silicate and sodium tetraborate.

6. The fibrous panel of claim 2, wherein the inorganic filler is selected from the group consisting of clay, mica, sand, barium sulfate, silica, talc, aragonite, magnesia, olivine, dolomite, tremolite, xonolite, vermiculite, gypsum, perlite, limestone (calcite or aragonite), magnesite, wollastonite, zinc oxide, zinc sulfate, hollow beads, bentonite salts, fly ash, bottom ash, coal ash, steel slag, iron slag, limestone slag, zeolite, and combinations thereof.

7. A method of coating a fibrous panel comprising:
providing a fibrous panel comprising a backing side and an opposing facing side;
depositing a first coating layer on at least one side of the fibrous panel, the first coating layer comprising an inorganic binder, wherein the inorganic binder is present in an amount between 10 and 100 wt. %, based on the total weight of the dry first coating layer, the inorganic binder comprises a borate salt and a metal silicate selected from the group consisting of an alkali metal silicate, an alkaline earth metal silicate, and combinations thereof, and the inorganic binder is water soluble.

8. The method of claim 7, wherein the first coating layer further comprises an inorganic filler, wherein the inorganic filler is present in an amount up to 90 wt. %, based on the weight of the dry first coating layer, and the inorganic binder and inorganic filler are not the same.

9. The method of claim 8, further comprising mixing the inorganic binder and the inorganic filler to form a curable coating composition prior to depositing the first coating layer.

10. The method of claim 7, further comprising:
depositing a second coating layer in contact with the first coating layer, the second coating layer comprising a second inorganic binder, wherein the second inorganic binder is present in an amount between 10 and 100 wt. %, based on the total weight of the dry second layer, the second inorganic binder comprises a borate salt and a metal silicate selected from the group consisting of an alkali metal silicate, an alkaline earth metal silicate, and combinations thereof, and the second inorganic binder is water soluble.

11. The method of claim 10, wherein second coating layer further comprises an inorganic filler, wherein the inorganic filler is present in an amount up to 90 wt. %, based on the weight of the dry second coating layer, and the inorganic binder and inorganic filler are not the same.

12. The method of claim 11, further comprising mixing the second inorganic binder and the inorganic filler to form a curable coating composition prior to depositing the second coating layer.

13. The method of claim 7, further comprising depositing a chemical curing layer.

14. The method of claim 13, wherein the chemical curing layer comprises a solution of a multivalent metal or acid.

15. The method of claim 14, wherein the solution of a multivalent metal or acid comprises a metal salt comprising a cation selected from the group consisting of beryllium, calcium, magnesium, strontium, barium, zinc, iron, aluminum, and combinations thereof.

16. The method of claim 14, wherein the solution of a multivalent metal or acid further comprises clay, mica, sand, barium sulfate, silica, talc, aragonite, magnesia, olivine, dolomite, tremolite, xonolite, vermiculite, gypsum, perlite, limestone (calcite or aragonite), magnesite, wollastonite, zinc oxide, zinc sulfate, hollow beads, bentonite salts, fly ash, bottom ash, coal ash, steel slag, iron slag, limestone slag, zeolite, and combinations thereof.

17. The method of claim 13, wherein the chemical curing layer comprises calcium chloride and clay.

18. The fibrous panel of claim 1, wherein the coating layer further comprises from 15 to 90 wt. % inorganic filler, based on the total weight of the cured coating layer, and the inorganic binder and the inorganic filler are not the same.

19. The fibrous panel of claim 1, wherein the coating layer is a back coating layer disposed on and in contact with the backing side of the panel.

20. A suspended ceiling tile system comprising the fibrous panel according to claim 19, wherein the backing side is directed to a plenum above the fibrous panel in the suspended ceiling tile system, and the fibrous panel is a ceiling tile.

* * * * *